(12) United States Patent
Murayama et al.

(10) Patent No.: US 7,804,027 B2
(45) Date of Patent: Sep. 28, 2010

(54) CABLE SUPPORTING DEVICE

(75) Inventors: Shigeki Murayama, Yokkaichi (JP); Yoshinao Kobayashi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 331 days.

(21) Appl. No.: 12/083,712

(22) PCT Filed: Jul. 11, 2006

(86) PCT No.: PCT/JP2006/313739

§ 371 (c)(1),
(2), (4) Date: Apr. 17, 2008

(87) PCT Pub. No.: WO2007/052386

PCT Pub. Date: May 10, 2007

(65) Prior Publication Data

US 2009/0140107 A1    Jun. 4, 2009

(30) Foreign Application Priority Data

Oct. 31, 2005    (JP)    ............................... 2005-315809

(51) Int. Cl.
    *H02G 3/04*    (2006.01)
(52) U.S. Cl. ..................... 174/68.3; 174/480; 248/49
(58) Field of Classification Search ............... 174/68.3, 174/480, 503; 248/49; 361/825, 826
    See application file for complete search history.

(56) References Cited

U.S. PATENT DOCUMENTS

| | | | | |
|---|---|---|---|---|
| 4,178,057 A | * | 12/1979 | McCormick | ............... 439/459 |
| 6,235,989 B1 | * | 5/2001 | Suthmann | ................... 174/657 |
| 6,285,565 B1 | * | 9/2001 | Åberg et al. | ................ 361/826 |
| 6,996,967 B2 | * | 2/2006 | Kobayashi | .................. 59/78.1 |
| 7,304,240 B1 | * | 12/2007 | Gretz et al. | ............... 174/72 A |
| 7,470,859 B1 | * | 12/2008 | Gretz | ........................ 174/72 A |
| 7,473,846 B2 | * | 1/2009 | Doerr et al. | .................... 174/69 |
| 7,485,801 B1 | * | 2/2009 | Pulter et al. | ................ 174/15.2 |
| 2003/0160137 A1 | * | 8/2003 | Shuey | .......................... 248/72 |
| 2004/0250525 A1 | | 12/2004 | Kobayashi | |
| 2004/0262024 A1 | * | 12/2004 | Kleeberger et al. | ........ 174/65 R |
| 2007/0025061 A1 | | 2/2007 | Kogure et al. | |
| 2009/0014210 A1 | * | 1/2009 | Forbis | ......................... 174/480 |
| 2009/0090549 A1 | * | 4/2009 | Betz | ............................ 174/486 |
| 2009/0283318 A1 | * | 11/2009 | Bonga et al. | ................ 174/350 |

FOREIGN PATENT DOCUMENTS

| | | |
|---|---|---|
| JP | 2002-127847 | 5/2002 |
| JP | 2004-040862 | 2/2004 |
| JP | 2004-282879 | 10/2004 |

* cited by examiner

*Primary Examiner*—Hung V Ngo
(74) *Attorney, Agent, or Firm*—Gerald E. Hespos; Michael J. Porco

(57) ABSTRACT

A device for supporting a cable between a vehicle body and a movable member movably connected to the vehicle body is provided with a guide including a frame having a three-dimensional outer surface and a supporting member for rotatably tightly holding the arcuate surface of the guide, the support being fixed to the vehicle body and/or the movable member. The frame of the guide includes a first opening and a second opening communicating with a hollow portion thereof and used for insertion of the cable, a tube projecting from the peripheral edge of the first opening and a rotational angle restriction projecting from the outer surface of the frame while being spaced apart by a required angle from the tube. The support includes a contact engageable with the rotational angle restriction, and at least one of facing surfaces of the contact and the rotational angle restriction is an inclined surface.

7 Claims, 15 Drawing Sheets

CABLE SUPPORTING DEVICE

BACKGROUND OF THE INVENTION

1. Field of the Invention

The present invention relates to a cable supporting device and is particularly designed to support a cable spanning between a slide door of a vehicle and a vehicle body in such a manner as to be able to follow the cable when the cable changes its angle in vertical, transverse and oblique directions as the slide door is opened and closed.

2. Description of the Related Art

Electrical parts such as a power window and a door lock are installed a door of an automotive vehicle, and a cable (door harness) for constantly feeding power is connected with these electrical parts. The cable is arranged to extend toward the vehicle body and connected with a power-supply side cable in the vehicle body.

If the door is a slide door, it may move in vertical direction normal to a sliding direction and transverse direction at the time of being closed and opened. Thus, the angle of the cable spanning between the slide door and the vehicle body changes with respect to transverse and vertical directions.

The cable spanning between the slide door and the vehicle body is fixed to and supported on the vehicle body, but it is necessary to provide a mechanism capable of following the angular change of the cable in vertical, transverse and oblique directions in the supporting device.

U.S. Patent Application Publication No. 2004/0250525 proposes a device shown in FIG. 15 as a cable supporting device of this type. In this device, a cable spanning between a vehicle body and a slide door is covered by a cable guide 2 formed by connecting a plurality of link members 1, one end of the cable guide 2 is connected with a supporting member 3 fixed to the vehicle body and the cable inserted through the cable guide 2 is passed through the supporting member 3.

The supporting member 3 and the link member la at the leading end of the cable guide 2 are rotatably connected via a connection pin P1 extending in horizontal direction, so that the link member la is swingably connected with the supporting member 3 in vertical direction so as to follow the angular change of the cable in vertical direction. On the other hand, the adjacent link members 1 of the cable guide 2 are connected rotatably in transverse direction by connection pins P2 extending in vertical direction so as to be able to follow the angular change of the cable in transverse direction.

Specifically, by setting the mounting direction of the pins P2 connecting the link members 1 of the cable guide 2 and that of the pin P1 connecting the link member 1a of the cable guide 2 at the leading end of the cable guide and the supporting member 3 orthogonal to each other, a mechanism can follow the angular change of the cable in vertical and transverse directions.

In the cable supporting device of U.S. Patent Application Publication No. 2004/0250525, an amount of vertical displacement is restricted to a vertical angular range in which the link member 1a at the leading end of the cable guide 2 can rotate about the pin P1 and an amount of transverse displacement is restricted to a transverse angular range in which the link members 1 of the cable guide 2 can rotate about the pins P2. Further, the construction of U.S. Patent Application Publication No. 2004/0250525 cannot cope with inclining movements in oblique directions.

An amount of vertical angular change of a slide door of an automotive vehicle differs depending on the vehicle type. Further, the slide door is constructed to obliquely move with respect to vertical direction as being slid from a closed state to an open state. This angle of inclination also differs depending on the vehicle type. Further, the mounting position and mounting angle of the cable supporting device on the vehicle also differ.

If the vertical rotational angular range is restricted as in U.S. Patent Application Publication No. 2004/0250525, it takes time to consider the mounting position and mounting angle of the cable supporting device for each vehicle type. If the vertical displacement of the cable is large or the angle of inclination thereof is large, the cable itself is twisted in the construction of U.S. Patent Application Publication No. 2004/0250525. However, such a displacement or inclination may not be absorbed in some cases.

In U.S. Patent Application Publication No. 2004/0250525, the link member 1a at the leading end of the cable guide 2 is swingably connected with the cable supporting member 3 in vertical direction, and the link members 1 successively connected with the vertically swingable link member 1a in forward and backward directions are swingably connected in transverse direction. In other words, the cable passing through the link member 1a at the leading end is swung in vertical direction, but cannot be swung in transverse direction, and a transverse swinging movement is caused by the link member 1 connected with the link member 1a and the following link members 1. Therefore, the cable can make no transverse swinging movement at a position proximate to the cable supporting member 3, thereby being twisted in the link members.

Further, since the connecting direction of the vertically swingable link member 1a at the leading end with the supporting member 3 by the pin and that of the transversely swingable link members by the pins differ in U.S. Patent Application Publication No. 2004/0250525, all the link members cannot have the same shape and the link member 1a at the leading end needs to be separately provided. This increases the number of parts and, since the link member 1a at the leading end is essential, there is a problem of requiring a larger arrangement space.

The present invention was developed to solve the above problems of U.S. Patent Application Publication No. 2004/0250525 and an object thereof is to provide a cable supporting device capable of coping with amounts of vertical and transverse angular changes of a cable despite their magnitudes, coping with angular changes of the cable in oblique directions and, hence, sufficiently coping with angular changes of the cable even if the mounting position and mounting angle thereof on a vehicle slightly differ.

SUMMARY OF THE INVENTION

In order to solve the above problems, the invention is directed to a cable supporting device for supporting a cable arranged between a vehicle body and a movable member movably connected to the vehicle body, comprising: a guide member including a frame body having a three-dimensional surface on the outer surface thereof; and a supporting member for rotatably tightly holding the arcuate surface of the guide member, the supporting member being fixed to the vehicle body and/or the movable member, wherein: the frame body of the guide member includes a first opening and a second opening communicating with a hollow portion thereof and used for the insertion of the cable, a tubular portion projecting from the peripheral edge of the first opening and a round tubular or cylinder rotational angle restricting portion projecting from the outer circumferential surface of the frame body while being spaced apart by a required angle from the tubular portion, whereas the supporting member includes a contact portion having an arcuate surface for surrounding the outer circumferential surface of the rotational angle restricting portion and at least either one of facing surfaces of the contact portion and the rotational angle restricting portion is an inclined surface, and the cable is inserted into the second opening from the first opening of the guide member through the hollowing portion, the changing rotational angle of the cable in transverse direction is restricted by bringing the tubular portion of the guide member into contact with the peripheral edge of the opening of the supporting member, whereas angular changes in vertical and oblique directions are restricted to required angles by bringing the rotational angle restricting portion of the guide member and the contact portion of the supporting member into contact.

According to the present invention, the cable is supported by being inserted through the hollow portion of the rotatably supported guide member as described above, thereby being able to change its angle over a wide range in any of vertical, transverse and oblique directions.

Thus, as compared to a supporting device as disclosed in U.S. Patent Application Publication No. 2004/0250525 in which the angle of a cable can be changed in vertical direction within a specified angular range only between a supporting member and t a link member at the leading end and it can be changed in transverse direction within a specified angular range through the connection of the link members, amounts of angular displacements can be set over wider ranges. Therefore, such amounts of angular displacements are applicable to vehicle types having different directions of displacement and also to vehicle types having different angles of inclination in oblique directions, resulting in good versatility.

Further, since the supporting device of the present invention can cope with any angular changes in vertical, transverse and oblique directions over wide ranges, it is not necessary to consider the mounting position and mounting angle of the supporting device on a vehicle or the like and assemblability at the time of manufacturing can be improved.

Since only the vertical angular change is made and no transverse angular change is made between the supporting member and the link member at the leading end in U.S. Patent Application Publication No. 2004/0250525, there is a likelihood that the cable is twisted at this position to exert an excessive load on the cable. However, in the supporting device of the present invention, angular changes can be simultaneously made in vertical, transverse and oblique directions, wherefore there is no likelihood of twisting the cable, thereby protecting the cable.

Since the transverse rotation of the guide member is restricted by the contact of the tubular portion of the guide member with the peripheral edge of the opening of the supporting member and the vertical and oblique rotations thereof are restricted by the contact of the rotational angle restricting portion of the guide member with the contact portion of the supporting member, the damage of the cable due to excessive bending or twisting can be prevented. Particularly, the angles of inclination of the facing surfaces of the rotational angle restricting portion of the guide member and the contact portion of the supporting member are differentiated to bring the rotational angle restricting portion and the contact portion into surface contact when the guide member rotates in vertical or oblique direction. Therefore, the rotational angles of the guide member in vertical and oblique directions can be more accurately and reliably restricted.

The angle of inclination of the facing surface of the contact portion of the supporting member with respect to the facing surface of the projection of the guide member is preferably 3 to 10°.

Specifically, the first opening and the tubular portion of the guide member are provided at one side surface of the frame body, the second opening is formed in the upper end surface substantially orthogonal to the first opening and a tube or a shaft projects from the bottom end surface of the frame body to serve as a first rotational angle restricting portion, whereas the supporting member includes a first contact portion, which is a bearing portion to be engaged with the first rotational angle restricting portion, the first contact portion and the first rotational angle restricting portion are fitted while being spaced apart, either one of the inner and outer circumferential surfaces facing each other is an inclined surface, and the angles of the guide member in vertical and oblique directions are restricted by the angle of inclination of the inclined surface.

According to the above construction, if the guide member rotates by the required angle in vertical or oblique direction, the outer circumferential surface of the first rotational angle restricting portion, which is the tube or shaft provided on the guide member, and the inner circumferential surface of the first contact portion, which is the bearing portion provided on the supporting member, come into surface contact, whereby the rotational angles of the guide member in vertical and oblique directions can be more accurately and reliably restricted.

If the angle of the cable changes in transverse direction, the first rotational angle restricting portion of the guide member rotates in the first contact portion of the supporting member, whereby the guide member smoothly follows the rotation of the cable.

The first and second openings are preferably located at orthogonal positions circumferentially spaced apart by 90°, but the angular spacing between the first and second openings is not limited to 90° and is sufficient to be an angle smaller than 180°. Alternatively, the first and second openings may face each other.

Further, an annular projection may project as a second rotational angle restricting portion from a peripheral edge surrounding the second opening of the guide member and/or a peripheral edge at a side vertically opposite to the second opening, and the supporting member may include a second contact portion, which is a tubular projection fittable to the second rotational angle restricting portion while being spaced apart, at least either one of vertically facing surfaces of the second contact portion and the second rotational angle restricting portion may be an inclined surface, and the angles of the guide member in vertical and oblique directions may be restricted by the angle of inclination of the inclined surface.

Even with the above construction, if the guide member rotates by the required angle in vertical or oblique direction, the vertically facing surfaces of the second rotational angle restricting portion, which is the annular projection provided on the guide member, and the second contact portion, which is the tubular projection of the supporting member, come into surface contact, whereby the rotational angles of the guide member in vertical and oblique directions can be more accurately and reliably restricted.

Preferably, a bearing portion of the first contact portion doubles as the second contact portion and the upper end surface thereof is vertically opposed to the lower end surface of the annular projection of the second rotational angle restricting portion.

By providing the guide member with both first and second rotational angle restricting portions and providing the supporting member with both first and second contact portions, the guide member comes into contact with the supporting member at least at two positions when rotating in vertical or oblique direction, whereby the rotational angles of the guide member in vertical and oblique directions can be more accurately and reliably restricted.

Preferably, the left and right peripheral edges of the opening of the supporting member are formed by mounting contact members separate from the main body of the supporting member.

According to the above construction, the rotational angle of the guide member in transverse direction can be adjusted by replacing only angle restricting members, and the main bodies of other supporting members can be commonly used for other different vehicle types.

Preferably, the guide member is a spherical guide member including a spherical frame body, the first opening and the second opening of the guide member are located at orthogonal positions, and the leading end of a covering member, which is a chained link member or a corrugate tube covering the cable, is so connected to the first opening as to be rotatable within a specified angular range, whereas the cable extending from the leading end of the covering member is passed through the hollow portion of the guide member from the first opening, and pulled out from the second opening to be fixed to the supporting member.

According to the above construction, in the case of using the chained link member as the covering member for the cable, angular changes in vertical direction, which cannot be made by the chained link member, can be made by the rotation of the guide member. Thus, it is not necessary to connect the link member with the guide member in such a manner as to be vertically swingable, wherefore the link connected with the guide member can have the same shape as the other link members and may be so connected with the guide member as to be transversely swingable. As a result, there is no need to provide the link shaped differently from the other link members as in U.S. Patent Application Publication No. 2004/0250525 and the number of parts can be reduced.

The link member at the leading end rotates only in directions different from the other link members in U.S. Patent Application Publication No. 2004/0250525, whereas the link member at the leading end rotates in the same directions as the other link members in the case of using the supporting device of the present invention. Thus, an arrangement space can be reduced. Further, since the guide member as the supporting device itself rotates in the supporting device of the present invention, the arrangement space can be further reduced if the guide member is rotated in the same direction as the link members.

The cable is covered by a corrugate tube between the vehicle body and the movable member such as the slide door in some cases other than by the covering member made of the chained link member disclosed in the prior art. In such a case where the cable is covered by the corrugate tube, the corrugate tube can follow the cable not only in transverse direction, but also in vertical direction, but its angular ranges are limited. Therefore, by also supporting the cable covered by the corrugate tube in the vehicle body and/or the slide door using the cable supporting device of the present invention, the supporting device can follow the angular changes of the cable over wider ranges.

In the case of using the corrugate tube instead of the covering member in the form of the chained link member in this way, it is preferable to restrict the bending direction of the corrugate tube to prevent the corrugate tube from coming into contact with an external contact member, for example, by forming ribs extending in lengthwise direction in a specified section to project at a required position of the outer circumferential surface of the corrugate tube.

A supporting surface of the supporting member for rotatably supporting the arcuate surface of the guide member is preferably formed with grooves for discharging foreign matters.

In the case of using the supporting device for a cable arranged between a slide door and a vehicle body, dust, sand and water is likely to enter from the outside at an installation location of this supporting device. Thus, there is a high risk that foreign matters such as dust, sand and water deposit on rotational sliding surfaces of the guide member and the supporting member. In such a case, if the grooves for discharging these foreign matters are provided, a possibility that foreign matters are fixed to the rotational sliding surfaces to hinder the rotation of the guide member can be reliably eliminated.

The cable supporting device of the present invention constructed as described above can be optimally used as the one for a cable arranged between a vehicle body and a slide door, and the angular change of the cable can be followed by the rotation of the guide member as the slide door is opened and closed by fixing the supporting member rotatably tightly holding the guide member to the vehicle body and/or the door.

The cable may be a flat cable in which conductive members are arranged in parallel and laminated with an insulating resin sheet or an insulated round wire.

As described above, according to the present invention, the cable is supported by being inserted through the hollow portion of the guide member rotatably supported by the supporting member. Thus, regardless of in which of vertical, transverse and oblique directions the angle of the cable changes, such an angular change can be followed by the rotation of the guide member, wherefore no excessive load such as a twist is exerted on the cable. Further, only by the supporting device, displacements in vertical and transverse directions can be coped with despite their magnitudes and angular changes of the cable in oblique directions can be coped with.

Further, since the vertical and oblique rotations of the guide member are restricted by bringing the rotational angle restricting portion of the guide member into surface contact with the contact portion of the supporting member, the rotational angles of the guide member in vertical and oblique directions can be more accurately and reliably restricted.

DETAILED DESCRIPTION OF THE PREFERRED EMBODIMENTS

FIGS. 1 to 7 show a first embodiment of the present invention, and a cable supporting device 10 (hereinafter, referred to as a "supporting device 10") is for supporting a cable 20 arranged to span between an automotive vehicle body (not shown) and a slide door (not shown) slidably connected to the vehicle body by allowing the cable to be inserted therethrough.

Figure 1:
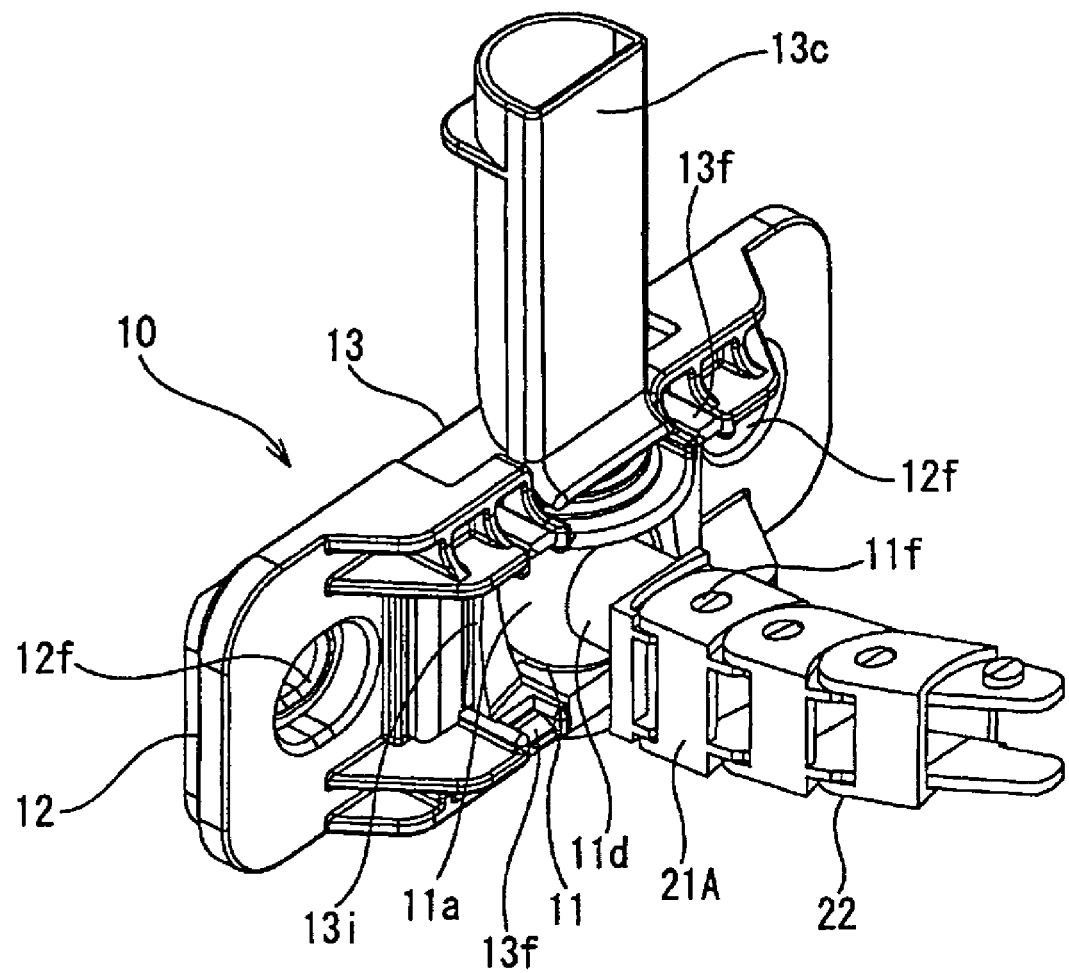
FIG. 1 is a perspective view of a cable supporting device according to a first embodiment of the invention.
Figure 2:
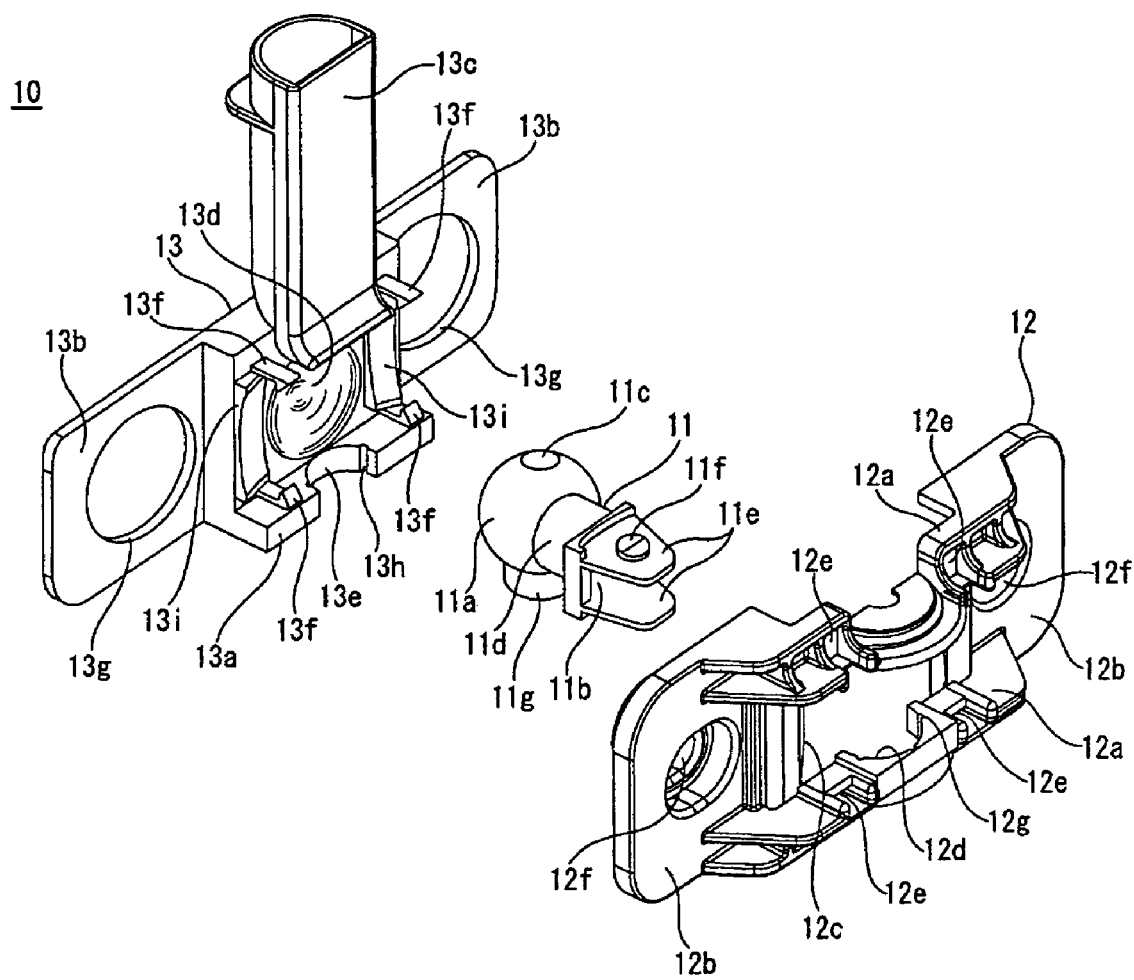
FIG. 2 is an exploded perspective view of the cable supporting device.

As shown in FIGS. 1 and 2, the supporting device 10 includes a spherical guide member 11 made of resin and a pair of first and second supporting members 12, 13 rotatably holding the spherical guide member 11 therebetween.

The spherical guide member 11 has a spherical frame body 11a, a first opening 11b communicating with a spherical hollow portion S1 of the frame body 11a is formed in one side surface of the frame body 11a, and a second opening 11c communicating with the hollow portion S1 is formed in the upper side spaced apart by 90° from the first opening 11b. A cylindrical tubular portion 11d projects from the peripheral edge of the first opening 11b, and a pair of connecting pieces 11e project from the opposite upper and lower edges at the leading end of the tubular portion 11d, wherein pin-shaped projections 11f are provided on these connecting pieces 11e. Further, a cylindrical tube 11g, which serves as a (first) rotational angle restricting portion, projects downward from the bottom end of the frame body 11a orthogonal to the first opening 11b. The tube 11g has a uniform outer diameter from the upper end to the bottom end.

Although the rotational angle restricting portion is a tube, it may be a solid shaft.

On the other hand, the cable 20 is covered by a chained link member 22 in which a multitude of link members are successively rotatably connected. The pair of connecting pieces 11e are placed on and rotatably connected with a leading-end link member 21A of this chained link member 22. Thus, the chained link member 22 is so connected with the spherical guide member 11 as to be able to change its angle in transverse direction (swingable in transverse direction).

The first supporting member 12 for tightly holding the spherical guide member 11 at one side includes supporting frames 12a in the form of upper and lower frames for rotatably tightly supporting the spherical guide member 11 and vehicle-body fixing portions 12b in the form of plates projecting sideways from the opposite left and right sides of the supporting frames 12a. A substantially rectangular opening 12c surrounded by the upper and lower supporting frames 12a and the left and right vehicle-body fixing portions 12b is formed in the center of the first supporting member 12. The transverse center of the lower supporting frame 12a is arcuately recessed to form a bearing portion 12d, which serves as a (first) contact portion. The inner circumferential surface of the bearing portion 12d is widened toward the bottom end, and a plurality of grooves 12g for discharging foreign matters are formed in the inner circumferential surface of the bearing portion 12d to extend from the upper end to the bottom end while being circumferential spaced apart. Further, bolt holes 12f are formed in the vehicle-body fixing portions 12b of the first supporting member 12.

The second supporting member 13 for tightly holding the spherical guide member 11 at the other side includes a supporting portion 13a in the form of a thick plate for rotatably tightly supporting the spherical guide member 11, vehicle-body fixing portions 13b in the form of thin plates projecting sideways from the opposite left and right sides of the supporting portion 13a, and a tubular portion 13c projecting upward from the upper side of the supporting portion 13a and having a hollow portion S2. A recessed portion 13d in conformity with the outer surface of the frame body 11a of the spherical guide member 11 is formed in the center of the supporting portion 13a, and a bearing portion 13e, which has the same shape as the bearing portion 12d of the first supporting member 12 and serves as a (first) contact portion, is provided below the recessed portion 13d. A plurality of grooves 13h for discharging foreign matters are formed in the inner circumferential surface of the bearing portion 13e to extend from the upper end to the bottom end while being circumferential spaced apart. Left and right contact portions 13i for restricting the rotational angle of the spherical guide member 11 in transverse direction project at the opposite left and right sides of the recessed portion 13d, and four locking pieces 13f to be inserted into the locking holes 12e of the first supporting member 12 for locking engagement are formed around the recessed portion 13d. Further, the vehicle-body fixing portions 13b are formed with bolt holes 13g.

With the spherical guide member 11 tightly held by the first and second supporting members 12, 13, the locking pieces 13f of the second supporting member 13 are inserted into the locking holes 12e of the first supporting member 12 for locking engagement to connect the first and second supporting members 12, 13 as shown in FIG. 1, whereby the spherical guide member 11 is rotatably tightly held by the first and second supporting members 12, 13. In this state, the upper and lower connecting pieces 11e of the first opening 11b of the spherical guide member 11 are caused to project from the opening 12c of the first supporting member 12, whereas the second opening 11c communicates with the hollow portion S2 of the tubular portion 13c of the second supporting member 13. Further, the bearing portion 12d of the first supporting member 12 and the bearing portion 13e of the second supporting member 13 are opposed to each other, thereby forming one bearing portion (contact portion) having a truncated conical shape and an inner circumferential surface widened toward the bottom end. In this embodiment, the inner circumferential surfaces of the bearing portions 12d, 13e are inclined by 5° with respect to the vertical outer circumferential surface of the tube 11g of the spherical guide member 11.

The cable 20 as a bundle of a plurality of wires arranged between the slide door and the vehicle body is inserted through the supporting device 10 having the spherical guide member 11 and the first and second supporting members 12, 13 assembled as above. In other words, the cable 20 inserted into the hollow portion S1 of the spherical guide member 11 from the first opening 11b is bent at 90° and inserted into the hollow space S2 of the tubular portion 13c through the second opening 11c, and the cable 20 pulled out from the upper end of the tubular portion 13c is fixed to the upper end of the tubular portion 13c by winding a tape T.

Further, upon being mounted on the vehicle, the supporting device 10 is fixed to a vehicle body panel by inserting unillustrated bolts (fastening members) through the communicating bolt holes 12f, 13g.

The cable 20 pulled out from the tubular portion 13c of the second supporting member 13 of the supporting device 10 is arranged in the vehicle body to be connected with a floor harness (not shown) by means of a connector, whereas the cable 20 inserted into the first opening 11b of the spherical guide member 11 is arranged to span between the vehicle body and the slide door and connected with a door harness (not shown) by means of a connector. In this way, the floor harness and the door harness are electrically connected via the cable 20.

Figure 3:
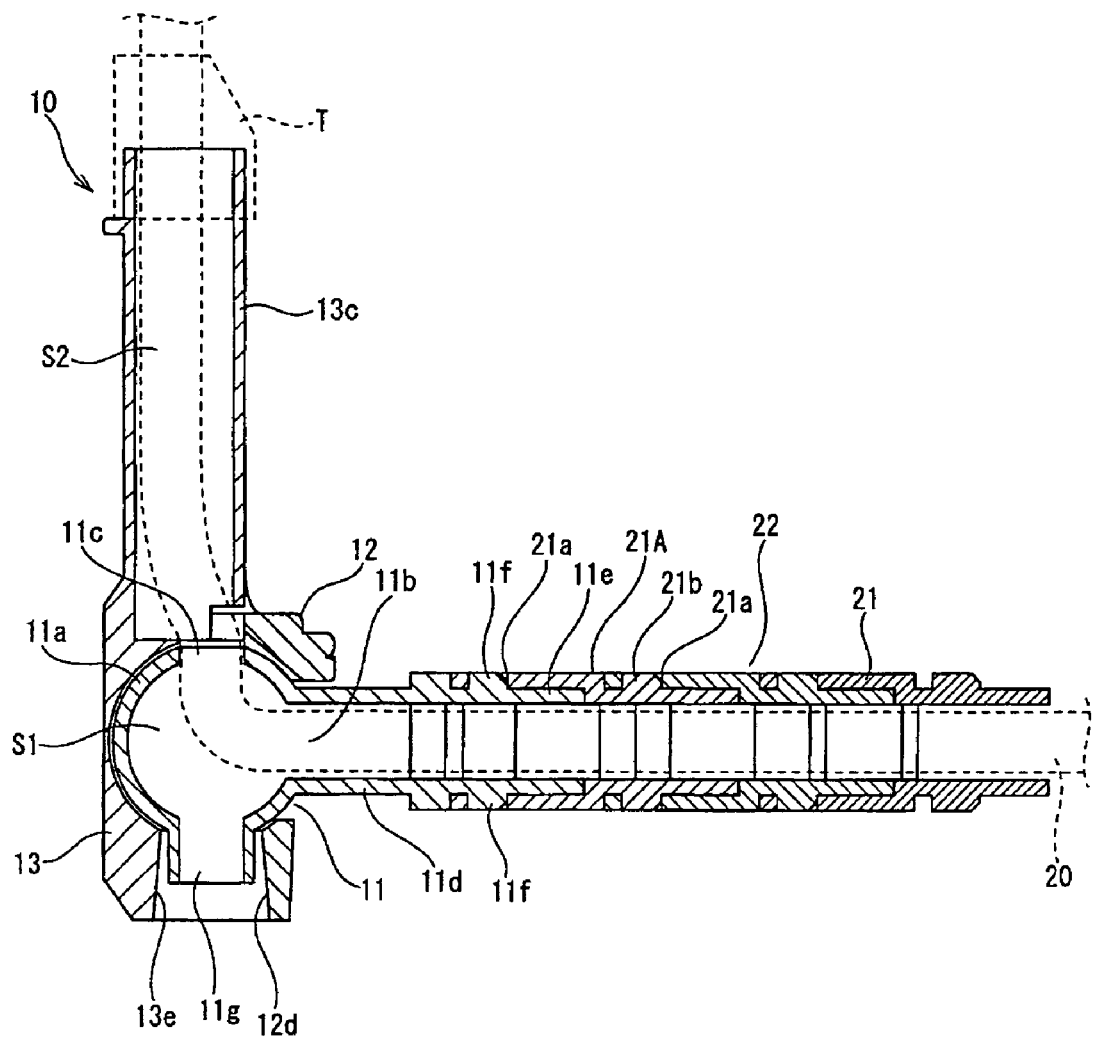
FIG. 3 is a vertical section of the cable supporting device.

The cable 20 inserted into the first opening 11b is covered by the chained link member 22 in which a plurality of link members 21 are connected. The link members 21 have a rectangular tubular shape. As shown in FIG. 3, a round through hole 21a is formed at the front or rear side of each of the upper and lower walls opposed to each other, and a pin-shaped projection 21b is provided on the opposite side thereof. A plurality of link members are so connected with each other as to be rotatable in transverse direction by fitting the pin-shaped projections 21b of one link member 21 into the through holes 21a of the adjacent link member 21. The through holes 21a of the leading-end link member 21A of the chained link member 22 covering the cable 20 are engaged with the pin-shaped projections 11f of the connecting pieces 11e of the spherical guide member 11 to rotatably connect the leading-end link member 21A. By connecting in this way, the chained link member 22 can be bent in transverse direction.

It should be noted that the link members and the leading-end link member and the spherical guide member 11 may be rotatably connected using separate pins.

As described above, according to the present invention, the cable 20 spanning between the vehicle body and the slide door is covered by the chained link member 22, inserted into the first opening 11b of the spherical guide member 11 connected with the leading-end link member 21A of the chained link member 22 at the vehicle body side, brought to the second opening 11c after passing the hollow portion S1 and pulled out through the hollow portion S2 of the tubular portion 13c from the second opening 11c.

Structurally, the chained link member 22 is bendable only in transverse direction, but the spherical guide member 11 is rotatably supported by the first and second supporting members 12, 13 so as to be rotatable in vertical, transverse and oblique directions. Thus, if the angle of the cable 20 inserted through the spherical guide member 11 changes in vertical, transverse or oblique direction, the spherical guide member 11 rotates to follow this angular change, wherefore the angle of the cable 20 smoothly changes.

Figure 4A:
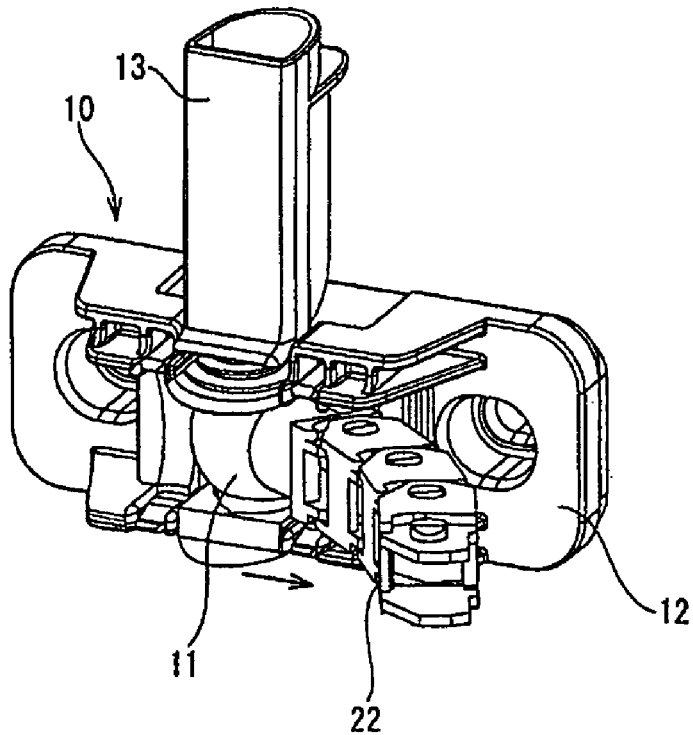
FIGS. 4(A) and 4(B) are diagrams showing a state where a spherical guide member is rotated in transverse direction.
Figure 4B:
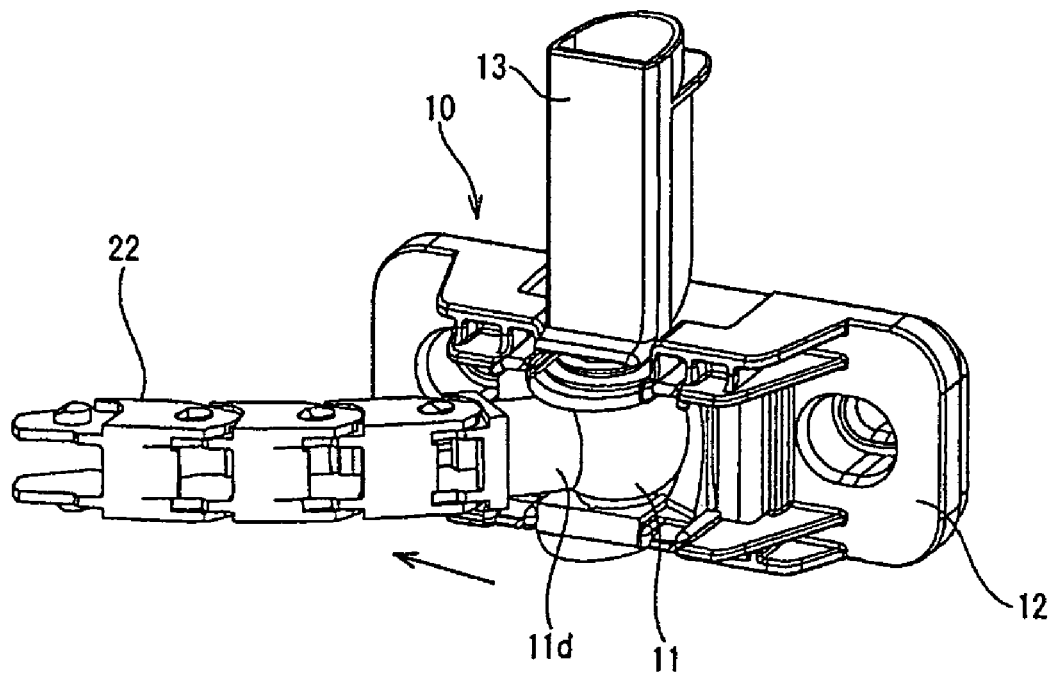
Figure 5:
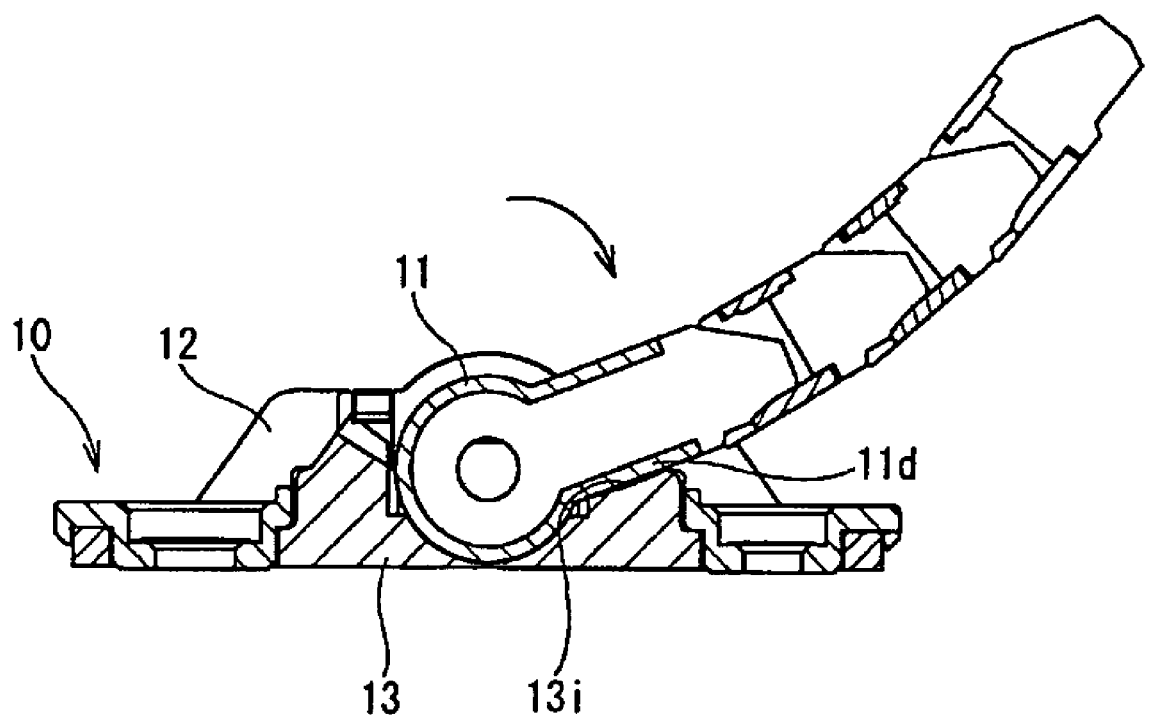
FIG. 5 is a horizontal section when the spherical guide member is rotated in transverse direction.

For example, if the slide door is moved in transverse direction and the cable 20 is displaced also in transverse direction, the spherical guide member 11 rotates in transverse direction in the first and second supporting members 12, 13 as shown in FIG. 4, whereby the angle changes in transverse direction over a wider range as compared to the transverse angular displacement only by the chained link member 22 to follow the angular change of the cable 20 in transverse direction. At this time, the tubular portion 11d of the spherical guide member 11 comes into contact with the left and right contact portions 13i of the second supporting member 13 as shown in FIG. 5, whereby the transverse rotation of the spherical guide member 11 is restricted to a required angle.

Figure 6A:
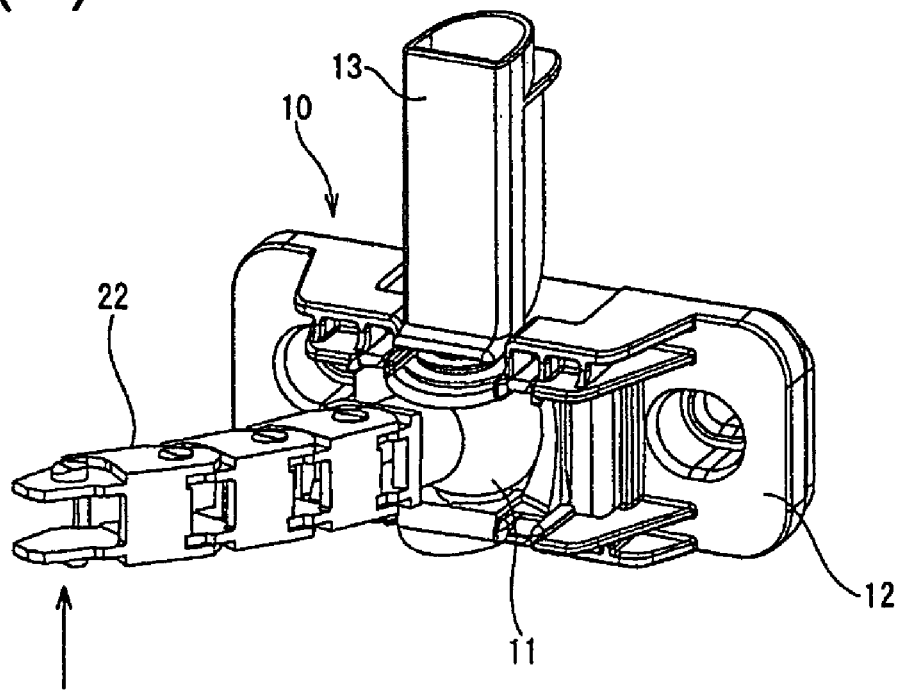
FIGS. 6(A) and 6(B) are diagrams showing a state where the spherical guide member is rotated in vertical direction.
Figure 6B:
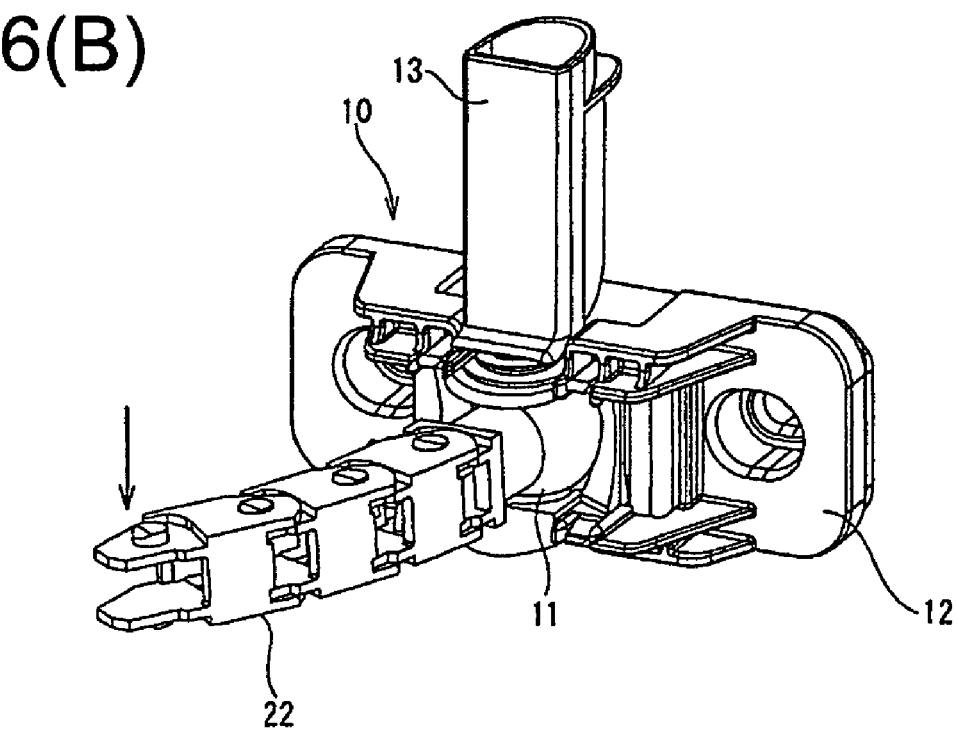
Figure 7:
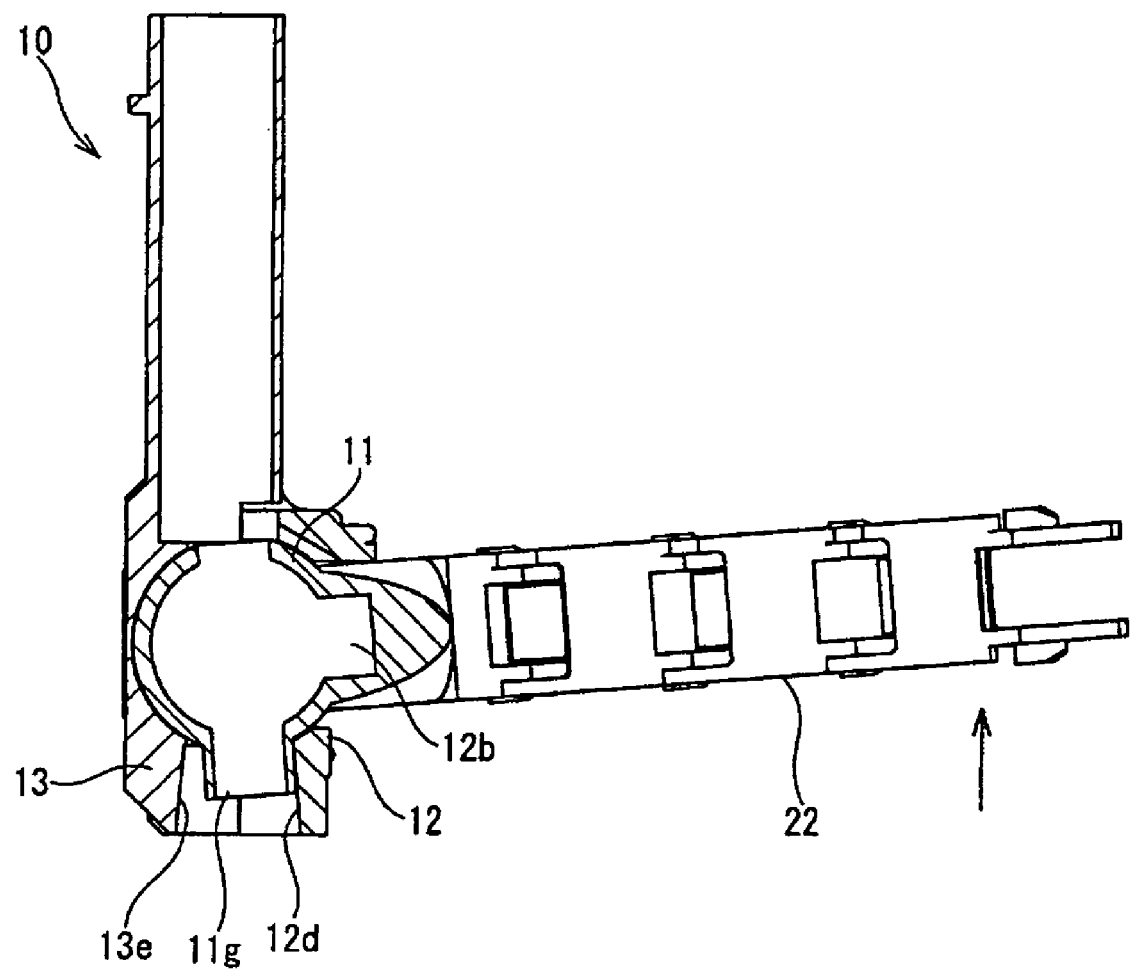
FIG. 7 is a vertical section when the spherical guide member is rotated in vertical direction.

Further, if the slide door is moved in vertical direction and the cable 20 is displaced also in vertical direction, the spherical guide member 11 rotates in vertical direction in the first and second supporting members 12, 13 as shown in FIG. 6, whereby a vertical angular change, which is impossible in the chained link member 22, is caused to follow a vertical displacement of the cable. If the spherical guide member 11 is rotated to move the first opening 12b upward, the tube 11g of the spherical guide member 11 is inclined toward the first supporting member 12 and the outer circumferential surface of the tube 11g comes into surface contact with the inner circumferential surface of the bearing portion 12d of the first supporting member 12 as shown in FIG. 7, whereby the rotation of the spherical guide member 11 is restricted to a required angle. Conversely, if the spherical guide member 11 is rotated to move the first opening 12b downward, the tube 11g of the spherical guide member 11 is inclined toward the second supporting member 13 and the outer circumferential surface of the tube 11g comes into surface contact with the inner circumferential surface of the bearing portion 13e of the second supporting member 13, whereby the rotation of the spherical guide member 11 is restricted to a required angle. Since the inner circumferential surfaces of the bearing portions 12d, 13e are inclined by 5° with respect to the outer circumferential surface of the tube 11g of the spherical guide member 11 in this embodiment, the spherical guide member 11 rotates only by 5° upward and downward.

Furthermore, if the slide door is inclined during its sliding movement and the angle of inclination of the cable 20 is also changed, the spherical guide member 11 rotates in circumferential direction in the first and second supporting members 12, 13 with respect to the opening 12c, whereby the angle of the chained link member 22 changes to follow the angular displacement of the cable 20 in an oblique direction. At this time as well, the outer circumferential surface of the tube 11g of the spherical guide member 11 comes into surface contact with the inner circumferential surfaces of the bearing portions 12d, 13e of the first and second supporting members 12, 13 to restrict the rotation of the spherical guide member 11 to a required angle.

As described above, in the supporting device 10 of the present invention, the angular changes of the cable in vertical, transverse and oblique directions can be followed by the rotation of the spherical guide member 11 and the amount of displacement of the cable is large. Therefore, this supporting device 10 can be used for other types of vehicles.

Since the rotations of the spherical guide member 11 in vertical and oblique directions are restricted by the surface contact of the tube 11g of the spherical guide member 11 with the bearing portions 12d, 13e of the first and second supporting members 12, 13, the rotational angles of the spherical guide member 11 in vertical and oblique directions can be more accurately and reliably restricted.

Further, since the connecting mode of the link members of the chained link member and that of the leading-end link member and the first supporting member of the supporting device are the same, the leading-end link member can have the same shape as the other link members, wherefore the number of parts can be reduced and the leading-end link member and the supporting member can be easily connected.

Although the supporting device 10 is fixed to the vehicle body in this embodiment, it may be provided on the slide door depending on the vehicle type or may be provided on both the vehicle body and the slide door. If the supporting device 10 is provided on both the vehicle body and the slide door, the movable range of the cable can be widened.

Figure 8:
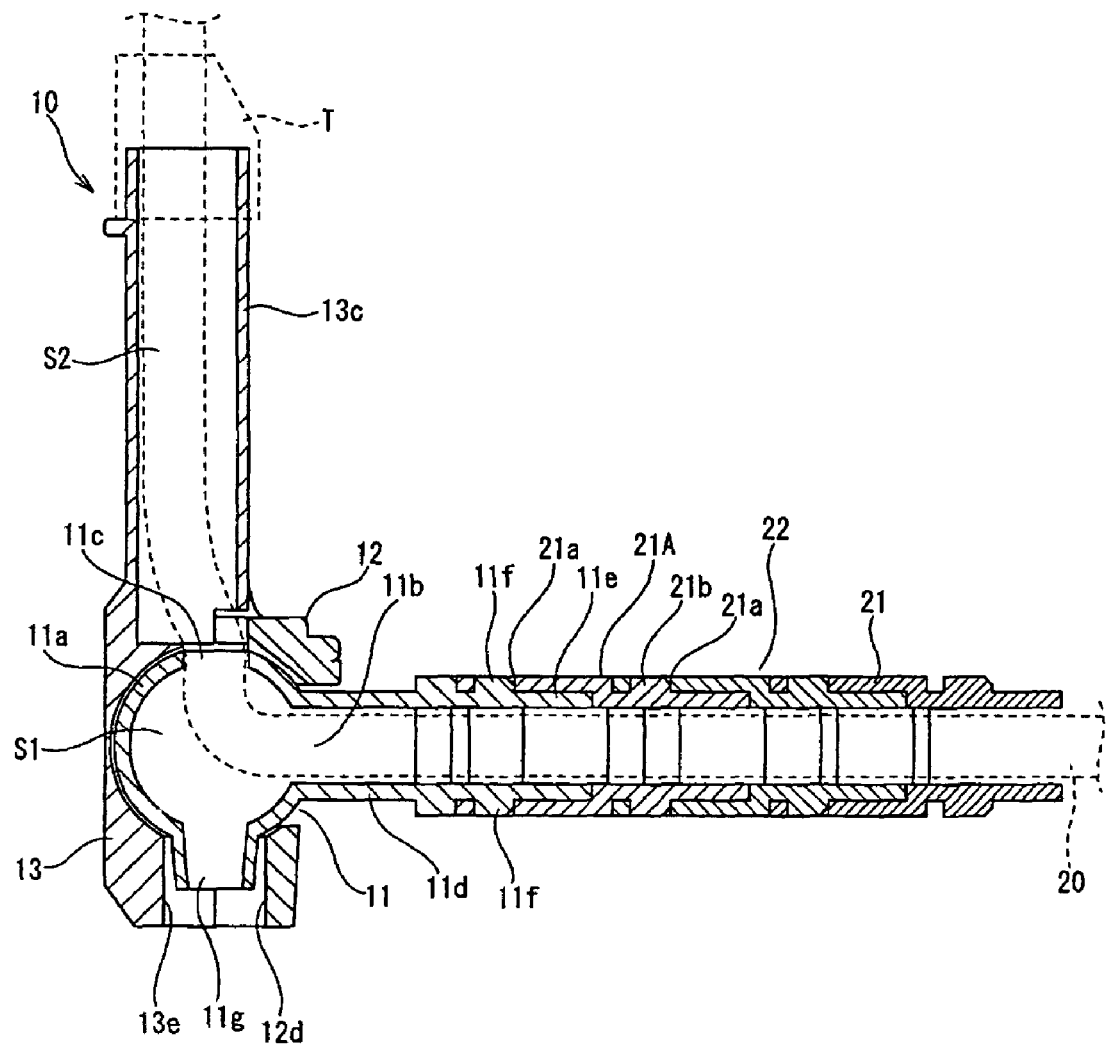
FIG. 8 is a diagram showing a modification of the first embodiment.
Figure 9:
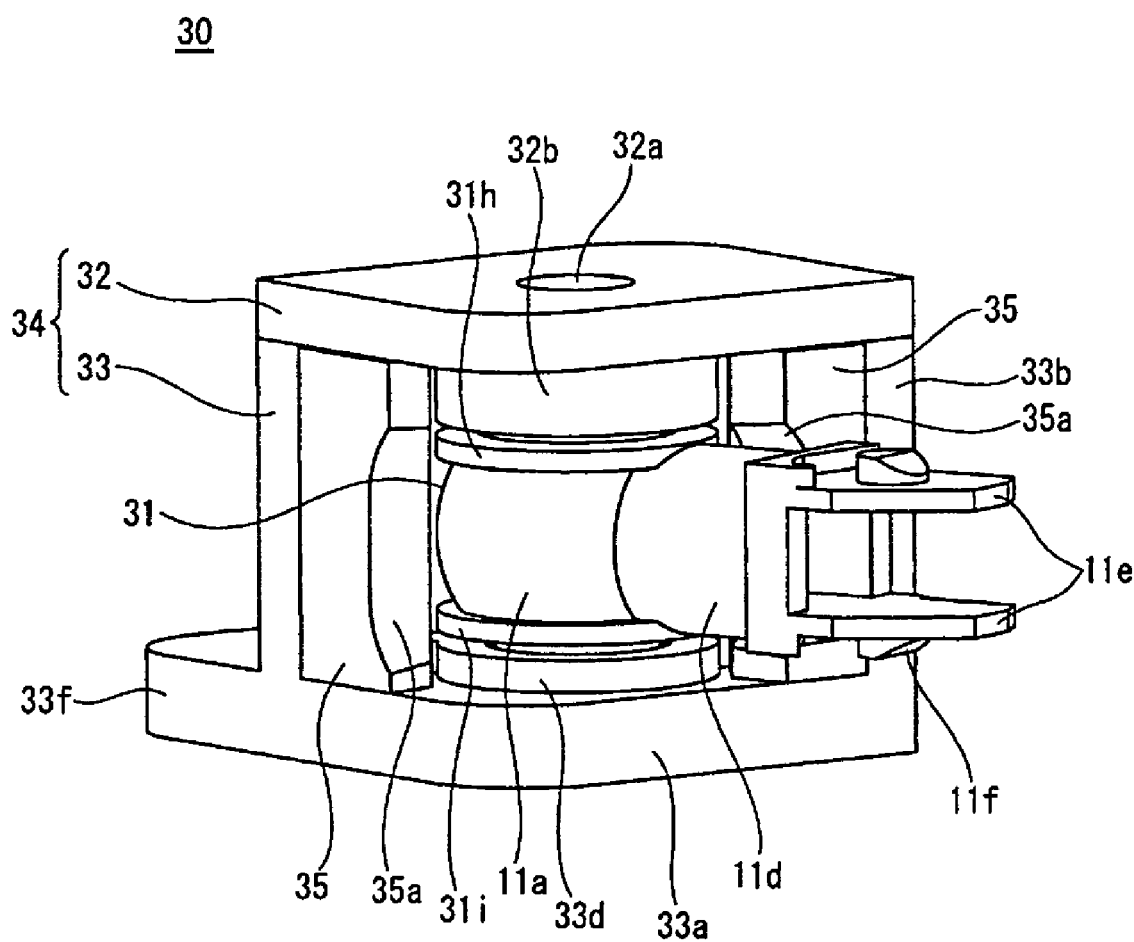
FIG. 9 is a perspective view of a cable supporting device according to a second embodiment of the invention.
Figure 10:
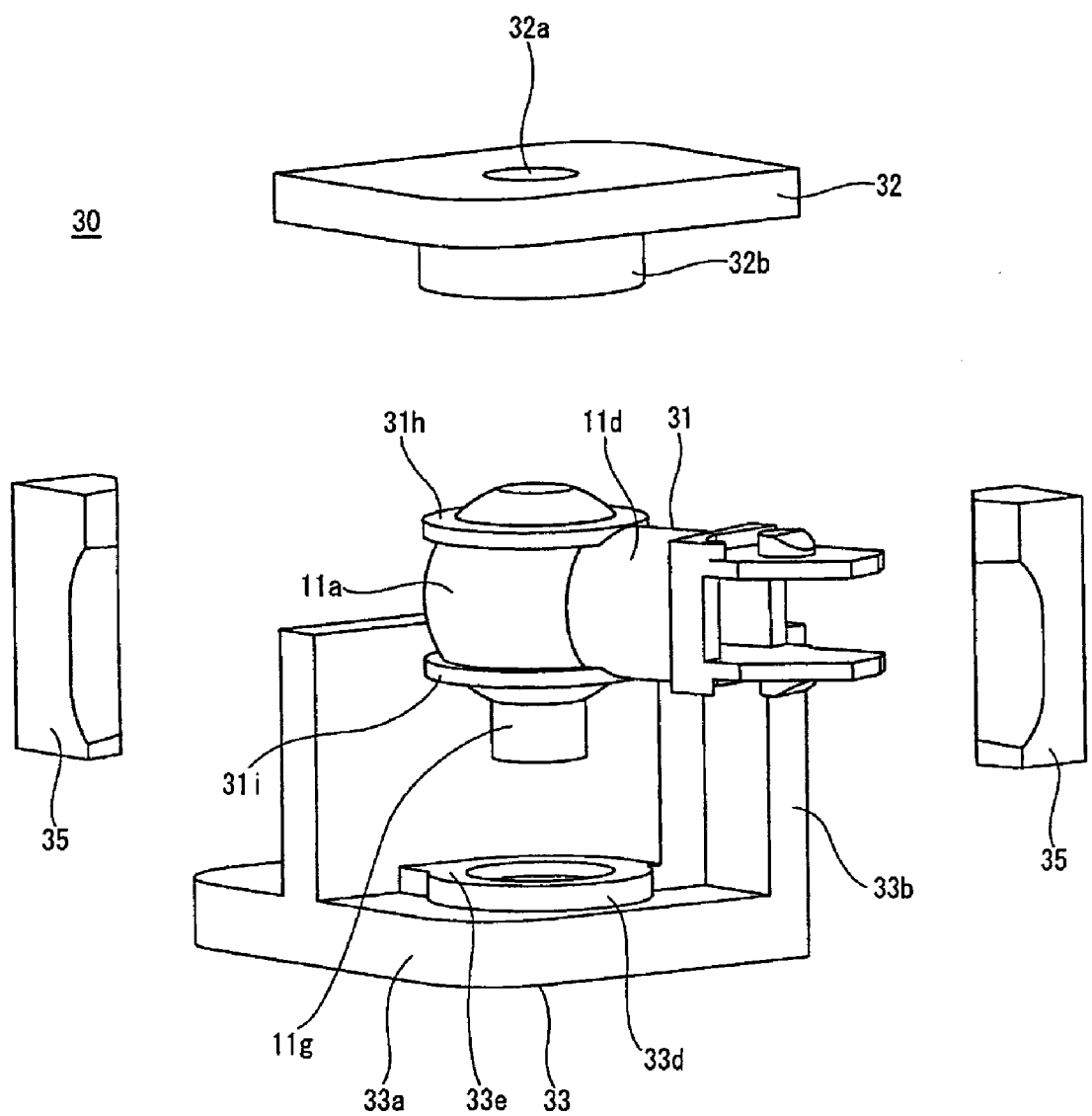
FIG. 10 is an exploded perspective view of the cable supporting device.

FIG. 8 shows a modification of the first embodiment.

In this modification, the tube 11g of the spherical guide member 11 has a truncated conical shape narrowed toward the bottom end, whereas the inner circumferential surfaces of the bearing portions 12d, 12e of the first and second supporting members 12, 13 have the same diameter from the upper end to the bottom end.

Even with the above construction, if the spherical guide member 11 is rotated in vertical or oblique direction, the tube 11g of the spherical guide member 11 comes into surface contact with the bearing portions 12d, 13e of the first and second supporting members 12, 13 to restrict the angle. Thus, the rotational angles of the spherical guide member 11 in vertical and oblique directions can be more precisely and reliably restricted.

Since the other construction, functions and effects are the same as in the first embodiment, no description is given thereon by identifying the other construction by the same reference numerals.

FIGS. 9 to 12 show a second embodiment of the present invention.

A cable supporting device 30 of this embodiment is provided with a spherical guide member 31 having substantially the same shape as in the first embodiment, a supporting member main body 34 comprised of first and second supporting members 32, 33 for tightly supporting the spherical guide member 31 and contact members 35 for restricting the transverse rotational angle of the spherical guide member 31.

Figure 12A:
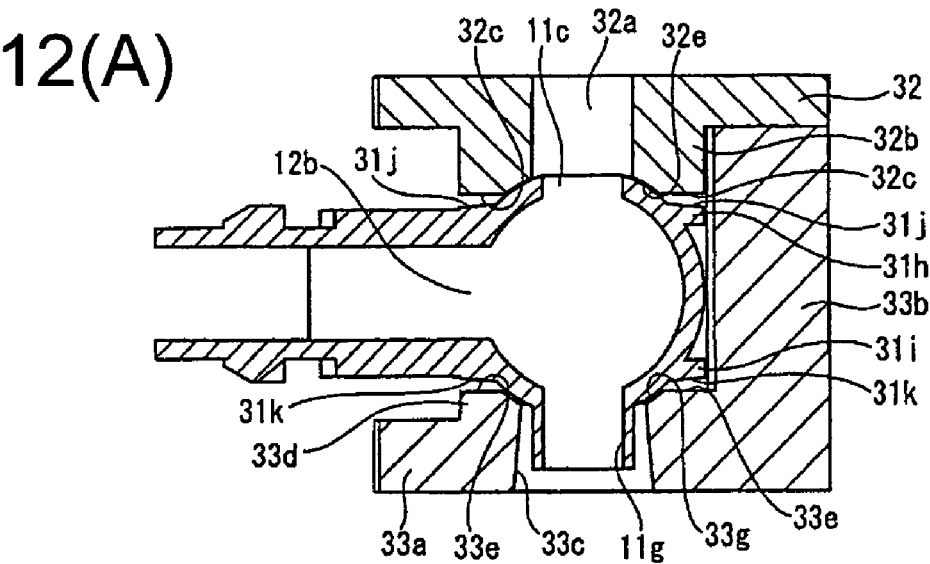
FIG. 12(A) is a vertical section showing a state where the spherical guide member is not rotated.
Figure 12B:
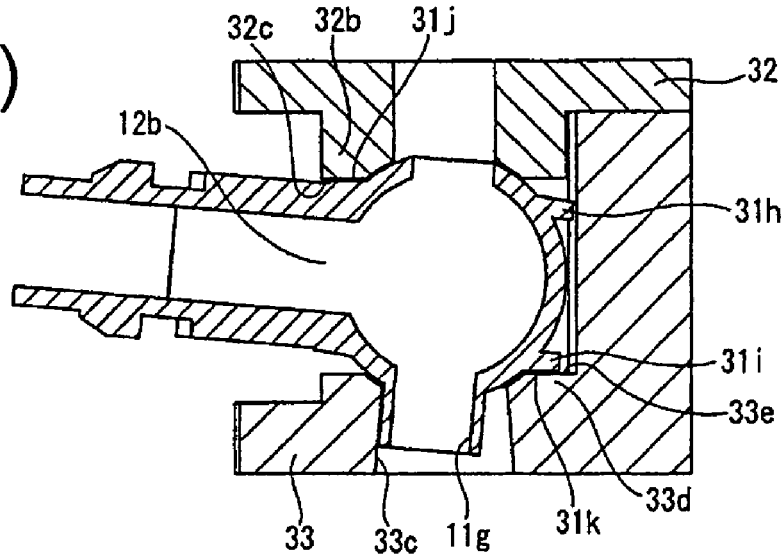
FIGS. 12(B) and 12(C) are vertical sections when the spherical guide member is rotated in vertical direction.
Figure 12C:
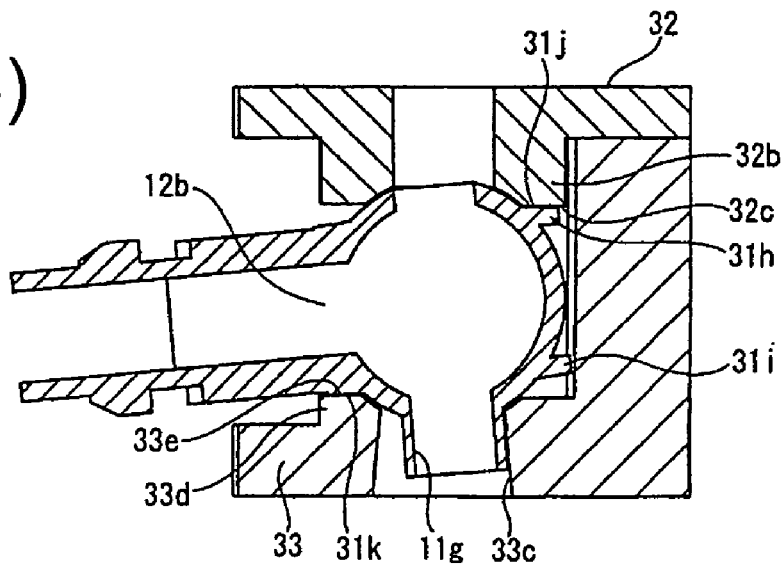

Although the spherical guide member 31 has substantially the same shape as in the first embodiment, annular projections 31h, 31i, which serve as second rotational angle restricting portions and surround a second opening 11c and a tube 11g, project at positions of the outer surface of the spherical frame body 11a at required distances from both upper and lower ends. These annular projections 31h, 31i project sideways from the outer surface of the frame body 11a and, as shown in FIG. 12, an upper surface 31j of the upper annular projection 31h is inclined downward toward the outer projecting end, whereas a lower surface 31k of the lower annular projection 31i is inclined upward toward the outer projecting end.

The first supporting member 32 for tightly holding the spherical guide member 31 from above is in the form of a flat plate, a through hole 32a used for the insertion of a cable is formed in the center of the first supporting member 32, and a tubular projection 32b (second contact portion) projects downward from the lower peripheral edge of the through hole 32a. A lower surface 32c of the tubular projection 32b is a horizontal surface, which serves as a contact surface with the annular projection 31h provided on the spherical guide member 31. Further, an arcuate surface 32e in conformity with the outer circumferential surface of the spherical guide member 31 is formed in the lower surface 32c of the tubular projection 32b along the peripheral edge of the through hole 32a.

The second supporting member 33 for tightly holding the spherical guide member 31 from below is comprised of a bottom wall portion 33a in the form of a flat plate and an L-shaped side wall portion 33b projecting upward from the bottom wall portion 33a. The bottom wall portion 33a is formed with a bearing portion 33c, which is a through hole having a truncated conical shape similar to the first embodiment and serves as a first contact portion, at a position facing the through hole 32a of the first supporting member 32. The bearing portion 33c is also formed with a plurality of grooves (not shown) for discharging foreign matters, which extend from the upper end to the bottom end while being circumferential spaced apart. A tubular projection 33d (second contact portion) projects upward also from the upper peripheral edge of the bearing portion 33c, and a horizontal upper surface 33e of the tubular projection 33d serves as a contact surface with the annular projection 31i provided on the spherical guide member 31. Further, an arcuate surface 33g in conformity with the outer circumferential surface of the spherical guide member 31 is formed in the upper surface 33e of the tubular projection 33d along the peripheral edge of the bearing portion 33c.

The second supporting member 33 is provided with a vehicle-body fixing portion 33f, and the supporting device 30 is fixed to a vehicle body by fastening bolts inserted through bolt holes (not shown) formed in the vehicle-body fixing portion 33f.

The contact members 35 are fixed at the opposite left and right sides of a space defined between the first and second supporting members 32, 33. An arcuate recessed portion 35a to be brought into contact with the tubular portion 11d of the spherical guide member 31 rotating in transverse direction is formed in the inner surface of each contact member 35. With the spherical guide member 31, the first and second supporting members 32, 33 and the contact members 35 assembled with each other, the spherical guide member 31 is rotatably tightly held from above and below by the arcuate surfaces 32e, 33g formed at the peripheral edges of the through holes of the tubular projections 32b, 33d and the tubular projections 32b, 33d are fitted to the annular projections 31h, 31i from the outer sides.

Although not shown, the first and second supporting members 32, 33 and the contact members 35 are interlocked with each other.

A chained link member similar to that of the first embodiment is rotatably connected with the connecting pieces 11e of the spherical guide member 31, and a cable is inserted through the chained link member to span between the vehicle body and a slide door.

If the slide door is displaced in transverse direction and the cable is also displaced in transverse direction, the spherical guide member 31 rotates in transverse direction in the first and second supporting members 32, 33, whereby the angle changes in transverse direction over a wider range as compared to angular displacements in transverse direction only by the chained link member to follow the displacement of the cable. At this time, the tubular portion 11d of the spherical guide member 31 comes into contact with the contact member 35, whereby the transverse rotation of the spherical guide member 11 is restricted to the required angle.

Figure 11A:
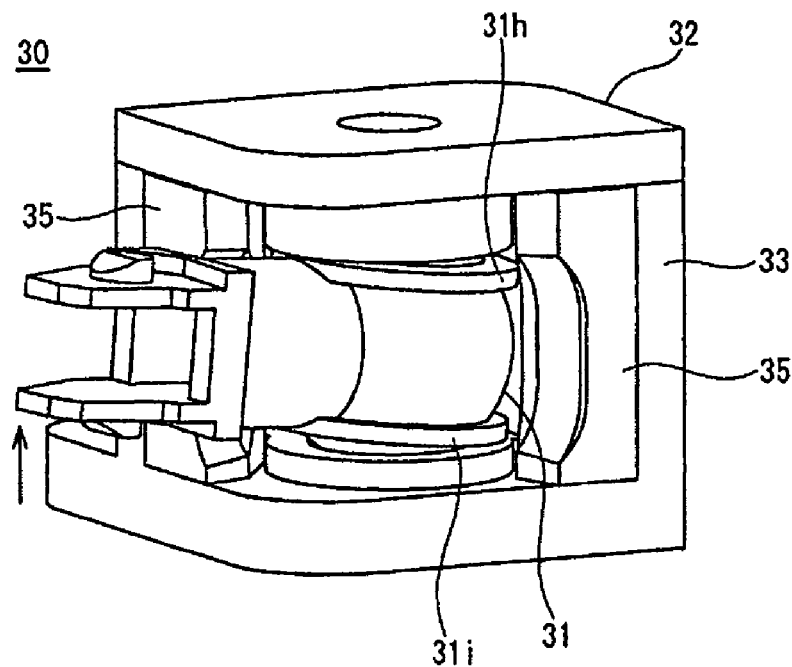
FIGS. 11(A) and 11(B) are diagrams showing a state where a spherical guide member is rotated in vertical direction.
Figure 11B:
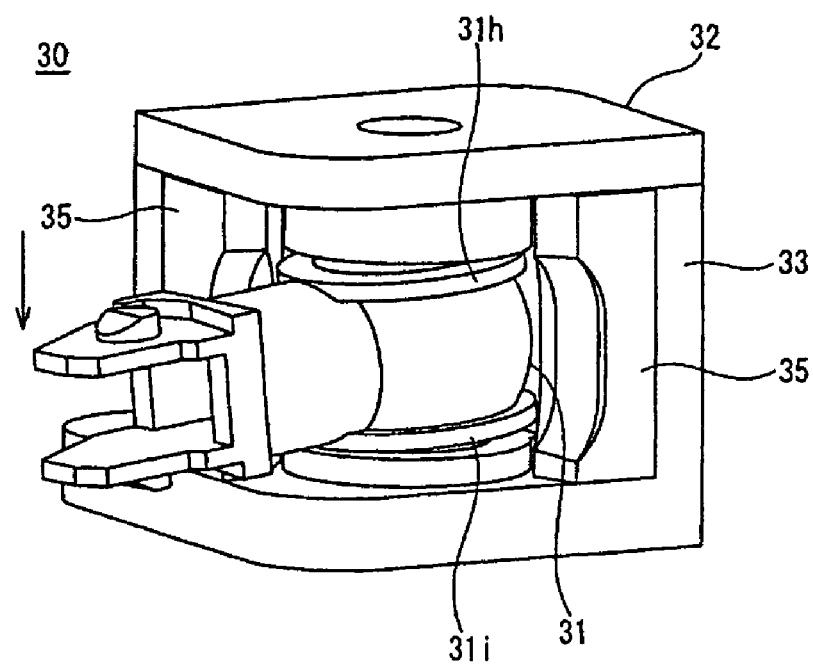

If the slide door is displaced in vertical direction and the cable is also displaced in vertical direction, the spherical guide member 31 rotates in vertical direction in the first and second supporting members 32, 33 as shown in FIG. 11, whereby a vertical angular change, which is impossible in the chained link member, is caused to follow a vertical displacement of the cable. If the spherical guide member 31 is rotated to move the first opening 12b upward, the outer circumferential surface of the tube 11g of the spherical guide member 11 comes into surface contact with the inner circumferential surface of the bearing portion 33c of the second supporting member 33 as shown in FIG. 12(B). Further, the upper surface 31j of the annular projection 31h comes into surface contact with the lower surface 32c of the tubular projection 32b of the first supporting member 32 at the side of the spherical guide member 31 toward the first opening 12b and the lower surface 31k of the annular projection 31i comes into surface contact with the upper surface 33e of the tubular projection 33d of the second supporting member 33 at the side opposite to the first opening 12b to restrict the rotation of the spherical guide member 11 to the required angle. Conversely, if the spherical guide member 31 is rotated to move the first opening 12b downward, the outer circumferential surface of the tube 11g of the spherical guide member 31 comes into surface contact with the inner circumferential surface of the bearing portion 33c of the second supporting member 33 as shown in FIG.

12(C). Further, the lower surface 31k of the annular projection 31i comes into surface contact with the upper surface 33e of the tubular projection 33d of the second supporting member 33 at the side of the spherical guide member 31 toward the first opening 12b and the upper surface 31j of the annular projection 31h comes into surface contact with the lower surface 32c of the tubular projection 32b of the first supporting member 32 at the side opposite to the first opening 12b to restrict the rotation of the spherical guide member 11 to the required angle.

Furthermore, if the slide door is inclined during its sliding movement and the angle of inclination of the cable is also changed, the spherical guide member 31 rotates in circumferential direction in the first and second supporting members 32, 33 with respect to the opening, whereby the angle of the chained link member changes to follow the angular displacement of the cable in an oblique direction. At this time as well, the outer circumferential surface of the tube 11g of the spherical guide member 31 comes into surface contact with the inner circumferential surface of the bearing portion 33c of the second supporting member 33 and the upper surface 31j of the annular projection 31h of the spherical guide member 31 or the lower surface 31k of the annular projection 31i thereof comes into surface contact with the lower surface 32c of the first supporting member 32 or the upper surface 33e of the second supporting member 33 to restrict the rotation of the spherical guide member 31 to the required angle.

Figure 13A:
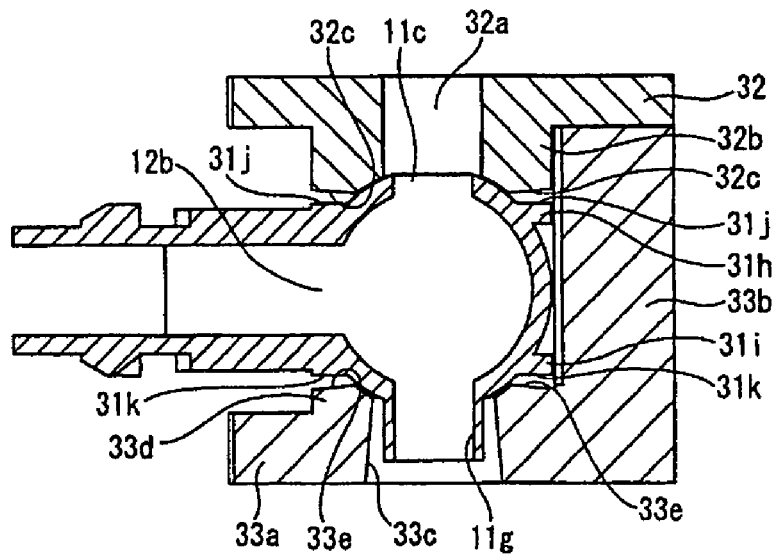
FIGS. 13(A) to 13(C) are diagrams showing a modification of the second embodiment.
Figure 13B:
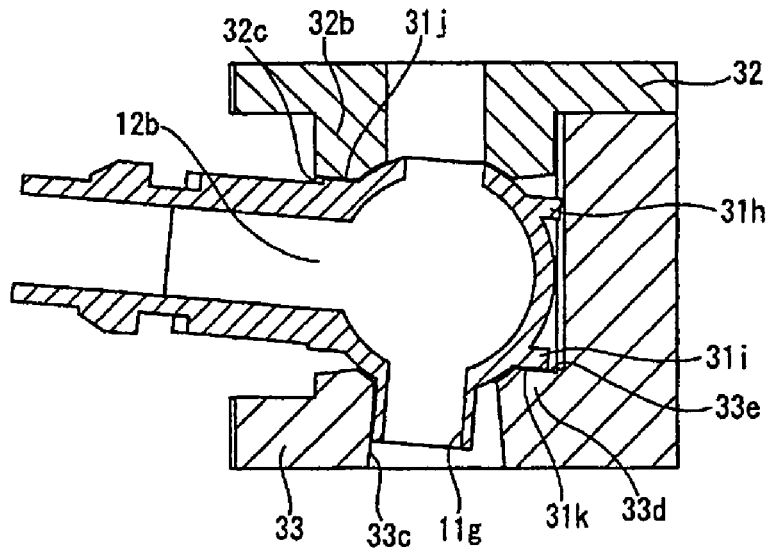
Figure 13C:
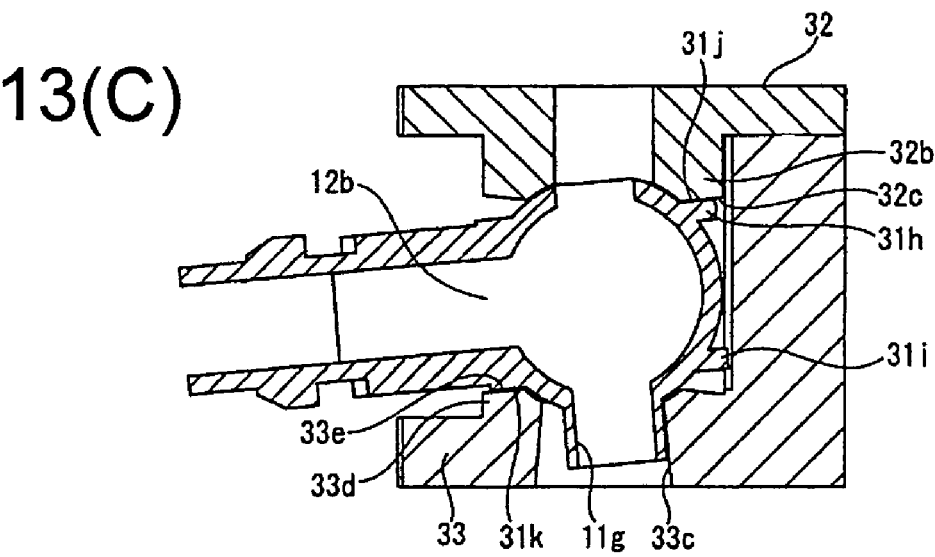

FIG. 13 shows a modification of the second embodiment.

In this modification, the annular projections 31h, 31i as the second rotational angle restricting portions and the tubular projections 32b, 33d as the second contact portions differ from those of the second embodiment. Specifically, in this modification, the upper surface 31j of the annular projection 31h and the lower surface 31k of the annular projection 31i are horizontal surfaces normal to the longitudinal direction of the tube 11g, whereas the lower surface 32c of the tubular projection 32b of the first supporting member 32 is inclined upward toward the outer side and the upper surface 33e of the tubular projection 33d of the second supporting member 33 is inclined downward toward the outer side.

Even with the above construction, if the spherical guide member 11 is rotated in vertical or oblique direction, the upper surface 31j of the annular projection 31h of the spherical guide member 31 or the lower surface 31k of the annular projection 31i thereof comes into surface contact with the inclined lower surface 32c of the tubular projection 32b or the inclined upper surface 33e of the tubular projection 33d to restrict the rotation of the spherical guide member 11 to a required angle.

Figure 14:
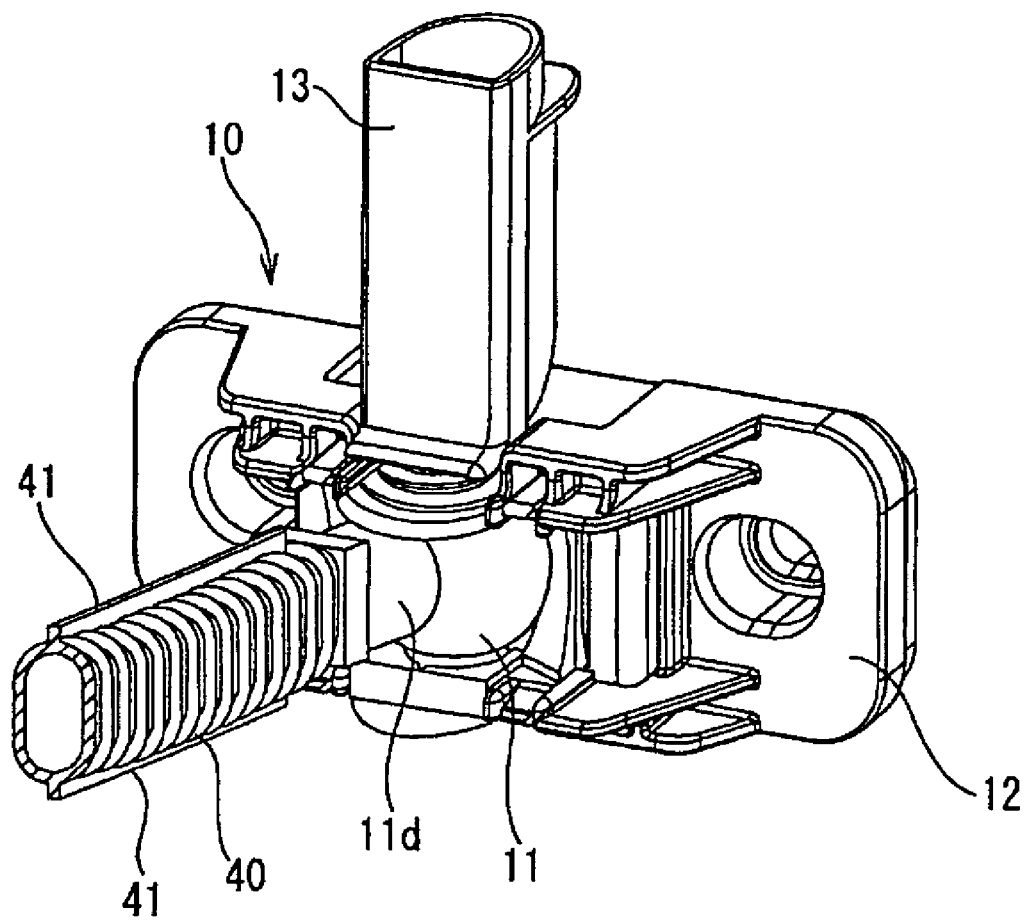
FIG. 14 is a perspective view of a supporting device according to a third embodiment.
Figure 15A:
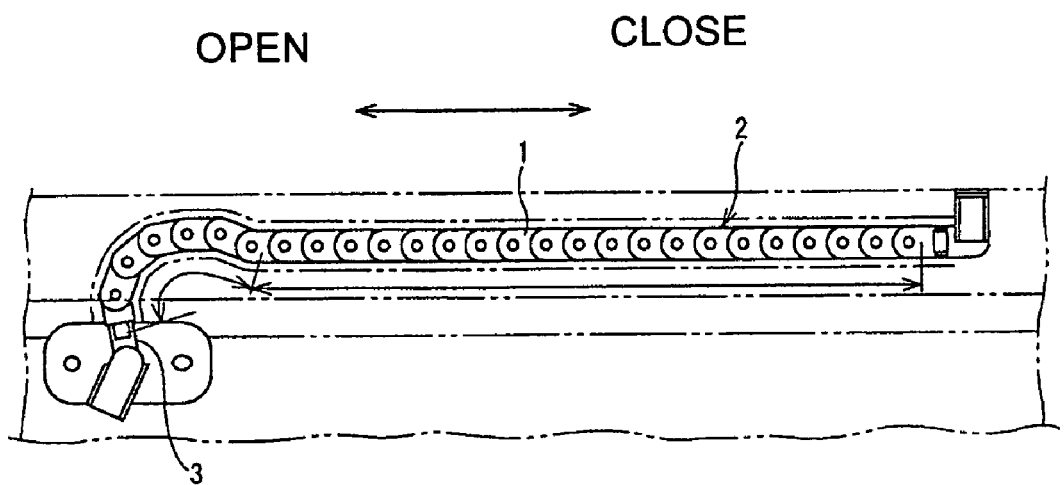
FIGS. 15(A) and 15(B) are diagrams showing a prior art device.
Figure 15B:
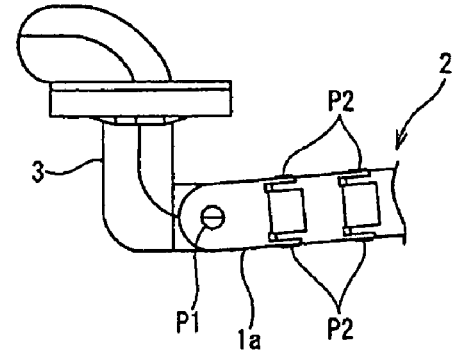

FIG. 14 shows a third embodiment of the present invention.

In this embodiment, the covering member covering the cable drawn out from the spherical guide member 11 of the supporting device 10 differs from that of the first embodiment. Specifically, in this embodiment, a corrugate tube 40, in which projected portions and recessed portions are alternately arranged in longitudinal direction, is mounted instead of the chained link member, and an end of the corrugate tube 40 toward the spherical guide member 11 is fitted and fixed in the tubular portion 11d of the spherical guide member 11. The corrugate tube 40 has an oblong cross-sectional shape along a direction normal to the longitudinal direction thereof, wherein the major axis direction of the corrugate tube 40 is a vertical direction and the minor axis direction thereof is a horizontal direction. Further, ribs 41 extending in longitudinal direction are provided at the opposite upper and lower ends of the outer circumferential surface of the corrugate tube 40, thereby making the corrugate tube 40 difficult to vertically bend and easy to transversely bend for the restriction of the bending direction.

The cross-sectional shape of the corrugate tube along the direction normal to longitudinal direction is not limited to the oblong shape, and may be an elliptical shape or a rectangular shape. If the bending direction can be restricted by the cross-sectional shape of the corrugate tube, it is not necessary to provide the ribs on the outer circumferential surface.

The cable is not shown in FIG. 14.

According to the above construction, the bending direction of the corrugate tube 40 is restricted to transverse direction, wherefore the cable can be bent in vertical direction and oblique direction by the rotation of the spherical guide member 11 while being prevented from hanging down.

It should be noted that the corrugate tube may be connected with the spherical guide member 30 of the second embodiment.

What is claimed is:

1. A cable supporting device for supporting a cable arranged between a vehicle body and a movable member movably connected to the vehicle body, comprising:
    a guide member including a frame body having a three-dimensional surface on the outer surface thereof; and
    a supporting member for rotatably tightly holding the arcuate surface of the guide member, the supporting member being fixed to the vehicle body and/or the movable member,
    wherein:
    the frame body of the guide member includes a first opening and a second opening communicating with a hollow portion thereof and used for the insertion of the cable, a tubular portion projecting from the peripheral edge of the first opening and a round tubular or cylindrical rotational angle restricting portion projecting from the outer circumferential surface of the frame body while being spaced apart by a required angle from the tubular portion,
    whereas the supporting member includes a contact portion engageable with the rotational angle restricting portion and at least either one of facing surfaces of the contact portion and the rotational angle restricting portion is an inclined surface, and
    the cable is inserted into the second opening from the first opening of the guide member through the hollowing portion, the changing rotational angle of the cable in transverse direction is restricted by bringing the tubular portion of the guide member into contact with the peripheral edge of the opening of the supporting member, whereas angular changes in vertical and oblique directions are restricted to required angles by bringing the rotational angle restricting portion of the guide member and the contact portion of the supporting member into contact.

2. A cable supporting device according to claim 1, wherein:
    the first opening and the tubular portion of the guide member are provided at one side surface of the frame body, the second opening is formed in the upper end surface substantially orthogonal to the first opening and a tube or a shaft projects from the bottom end surface of the frame body to serve as a first rotational angle restricting portion,
    whereas the supporting member includes a first contact portion, which is a bearing portion to be engaged with the first rotational angle restricting portion, the first contact portion and the first rotational angle restricting portion are fitted while being spaced apart, either one of the inner and outer circumferential surfaces facing each other is an inclined surface, and the angles of the guide member in vertical and oblique directions are restricted by the angle of inclination of the inclined surface.

3. A cable supporting device according to claim 1, wherein:
an annular projection projects as a second rotational angle restricting portion from a peripheral edge surrounding the second opening of the guide member and/or a peripheral edge at a side vertically opposite to the second opening, and the supporting member includes a second contact portion, which is a tubular projection fittable to the second rotational angle restricting portion while being spaced apart, at least either one of vertically facing surfaces of the second contact portion and the second rotational angle restricting portion is an inclined surface, and the angles of the guide member in vertical and oblique directions are restricted by the angle of inclination of the inclined surface.

4. A cable supporting device according to claim 3, wherein a bearing portion of the first contact portion doubles as the second contact portion and the upper end surface thereof is vertically opposed to the lower end surface of the annular projection of the second rotational angle restricting portion.

5. A cable supporting device according to claim 1, wherein the left and right peripheral edges of the opening of the supporting member surrounding the tubular portion of the guide member are formed by mounting contact members separate from a supporting member main body.

6. A cable supporting device according to claim 1, wherein:
the guide member is a spherical guide member including a spherical frame body,
the first opening and the second opening of the guide member are located at orthogonal positions, and
the leading end of a covering member, which is a chained link member or a corrugate tube covering the cable, is so connected to the first opening as to be rotatable within a specified angular range, whereas the cable extending from the leading end of the covering member is passed through the hollow portion of the guide member from the first opening, and pulled out from the second opening to be fixed to the supporting member.

7. A cable supporting device according to claim 1, wherein:
the cable is arranged between the vehicle body and a slide door,
the supporting member for rotatably tightly holding the guide member is fixed to the vehicle body and/or the slide door, and
the guide member rotates to follow the angular change of the cable as the slide door is opened and closed.

* * * * *